April 3, 1928.
H. C. PAECHT
1,664,790
AUTOMATIC GUARD FOR THE INTERMITTENTLY OPERATED RAMS OF POWER MACHINES
Filed Oct. 10, 1924  2 Sheets-Sheet 1
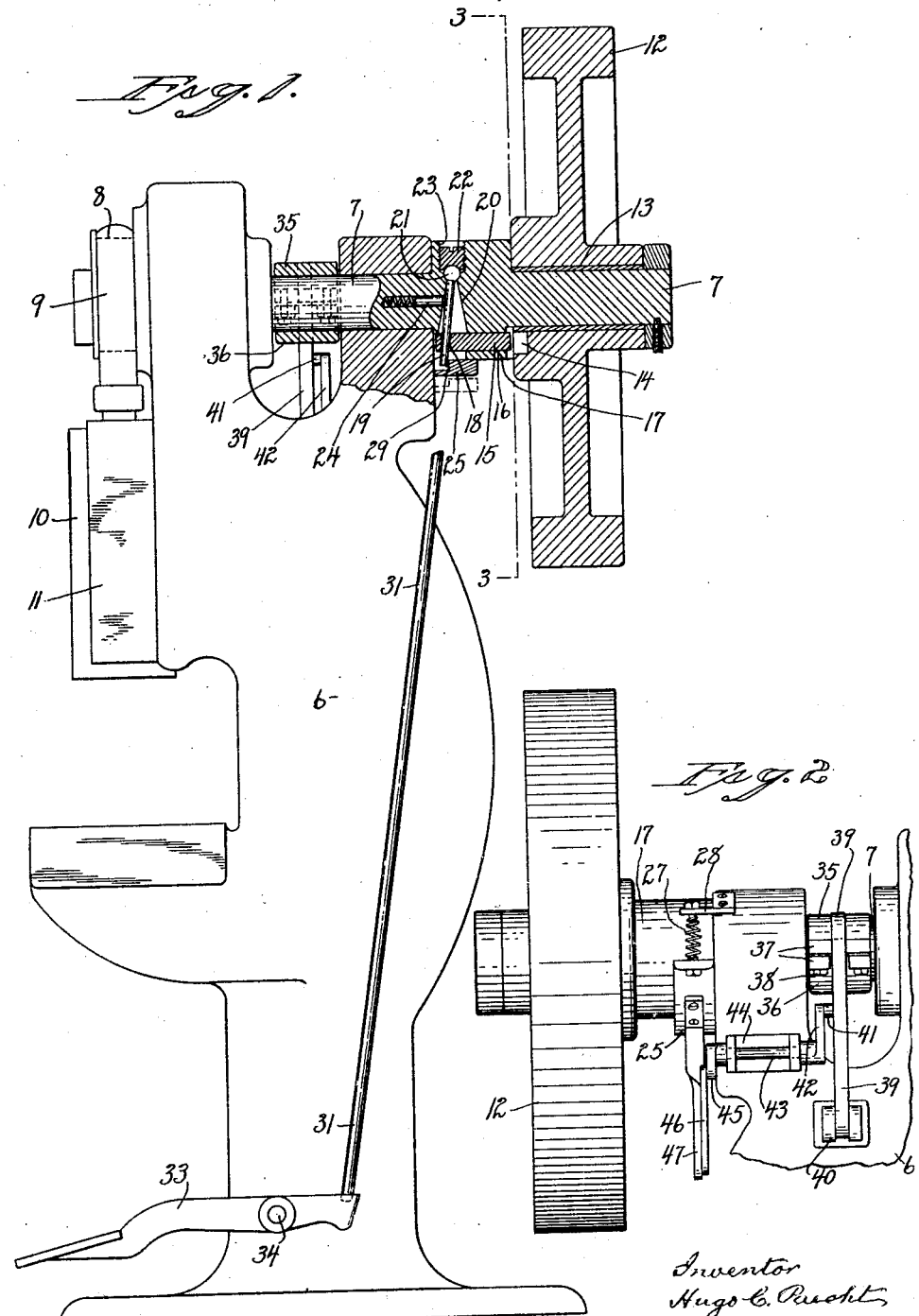

April 3, 1928. 1,664,790
H. C. PAECHT
AUTOMATIC GUARD FOR THE INTERMITTENTLY OPERATED RAMS OF POWER MACHINES
Filed Oct. 10, 1924 2 Sheets-Sheet 2
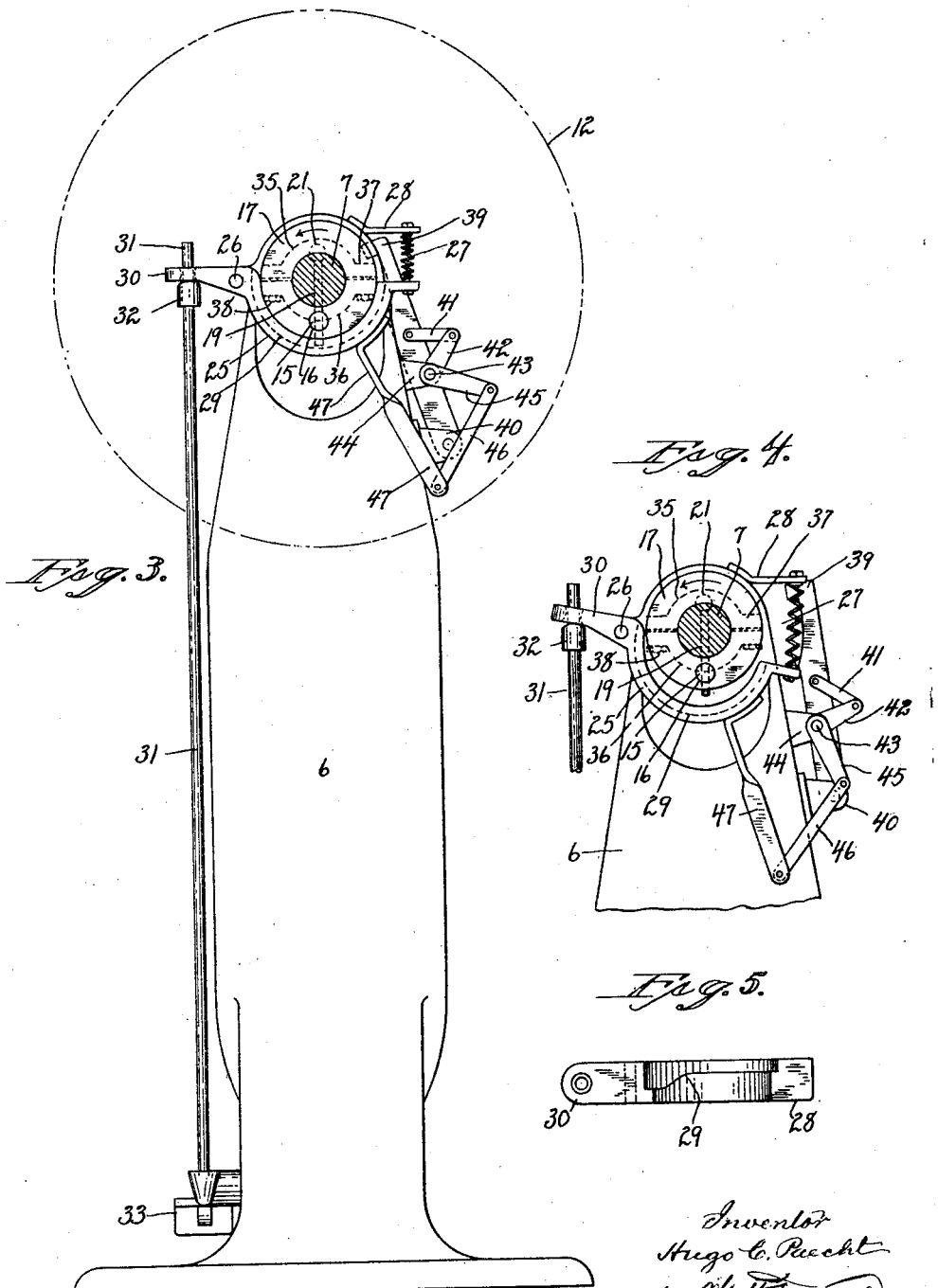
Inventor
Hugo C. Paecht
by W. H. Finckel
Associate Atty.

Patented Apr. 3, 1928.

1,664,790

UNITED STATES PATENT OFFICE.

HUGO C. PAECHT, OF NEW HAVEN, CONNECTICUT, ASSIGNOR TO STANDARD SAFETY MANUFACTURING CO., OF NEW HAVEN, CONNECTICUT, A CORPORATION.

AUTOMATIC GUARD FOR THE INTERMITTENTLY-OPERATED RAMS OF POWER MACHINES.

Application filed October 10, 1924. Serial No. 742,945.

My invention relates to an improved automatic guard for the intermittently-operated rams of power machines, such as power punch-presess and the like, the object being to provide simple, rugged and reliable means for preventing the accidents that are liable to result from an unintended second movement of the ram, due to a fault in the mechanism, such, for instance, as the failure of the friction relied upon to arrest the shaft, or the absense of adequate lubrication between the continuously-running fly-wheel and the shaft, or to other causes of whatever character.

With these ends in view, my invention consists in an automatic guard for the purpose described, the said guard coacting with the coupling mechanism of the machine, so as to stand in readiness to prevent the untimely movement of the ram.

My invention further consists in an automatic guard of the character described, having certain details of construction and combinations of parts as will be hereinafter described and particularly recited in the claims.

For the purpose of illustrating my invention, I have shown it as applied to a power-punch-press of the so-called "Ferracute" type, but I would have it understood that my invention is not so limited, nor to power punch-presses, since it may be utilized for guarding the intermittently-operated rams of other forms of power machines.

In the accompanying drawings:

Fig. 1 is a view partly in side elevation and partly in vertical section of a power punch-press, to which my invention has been applied;

Fig. 2 is a broken rear elevation of the top portion of the press;

Fig. 3 is a sectional view of the press on the line 3—3 of Fig. 1;

Fig. 4 is a broken view corresponding to Fig. 3 but showing the parts of my improved guard-mechanism in the positions due to them when the treadle is depresed; and Fig. 5 is a detached plan view of the latch of the coupling and uncoupling mechanism of the press.

As herein shown, the press-frame 6 mounts an intermittently-driven shaft 7 furnished at its forward end with an eccentric 8 encircled by a strap 9 connected with a ram or gate 10 which reciprocates in guide-ways 11 forming a part of the said frame. At its rear end, the said shaft carries a continuously-driven fly-wheel 12 having a bushing 13 and formed upon the forward face of its hub with a coupling-recess 14 receiving a key or bolt 15 reciprocating in a bearing-hole 16 formed in a collar-like enlargement 17 of the shaft toward the rear end thereof. For the operation of the said bolt, its forward end is formed with a transverse hole 18 receiving the projecting end of an operating-lever 19 swinging in a tapered transverse passage 20 in the shaft, the other end of the lever 19 having a spherical head 21 held in place by a nut 22 in a threaded bore 23 in the enlargement 17 aforesaid.

A spring-actuated plunger 24, also mounted in the shaft 7, exerts a constant effort to swing the lever 19 rearward and so insert the bolt 15 into the coupling-recess 14, whereby the shaft and fly-wheel are temporarily coupled together. The said bolt is, however, normally held in its retired position, against the influence of the plunger 24, by means of a transversely-arranged pivotal latch 25 hung on a pivot 26 in the frame 6, and curved to conform to the enlargement 17 of the shaft 7. A spring 27 connecting the outer or free end of the latch with a bracket 28 secured to the frame 6, exerts a constant effort to keep the latch in its elevated position, in which it maintains the bolt 15 in its retracted position against the influence of the plunger 18. To this end, the upper face of the latch is provided with a cam-surface 29 (Fig. 5), which co-acts with the projecting end of the lever 18 in retracting the bolt 15 and holding it in such position. The latch is provided, at its pivoted end, with a perforated operating-arm 30 receiving the upper end of a push-rod 31 carrying an adjustable collar 32 bearing upon the under-face of the said arm for lifting the same, and hence depressing the latch, when the said push-rod is lifted by the operation of a treadle 33 hung on a stud 34 in the lower end of the frame 6 and receiving the lower end of the said rod. The mechanism thus far described is of standard construction and specifically forms no part of my invention.

In the operation of the press, as thus far described, the coupling of the fly-wheel 12 with the shaft 7 is controlled by the treadle 33 and it is designed that the shaft shall make but a single revolution for every separate depression of the treadle by the pressman. In other words, in the normal operation of the machine, the rotary movement of the shaft will stop as soon as the bolt or key 15 is withdrawn from the recess 14 in the fly-wheel 12. However, it is a matter of common experience that some untoward conditions, such as the failure of the friction device of the press, or the absence of lubrication between the shaft 7 and the fly-wheel, will result in the continued rotation of the shaft, even though the bolt is seasonably withdrawn from the fly-wheel, followed by a second unpremeditated descent of the ram or gate, attended by grave danger to the pressman.

It is the specific purpose of my invention to guard against this unpremeditated and, in a sense, accidental, excess and dangerous movement of the shaft, and hence of the ram or gate 10, after the shaft has been uncoupled from the fly-wheel by releasing the pressure on the treadle, whereby such accidents as have heretofore been common are rendered impossible.

The guard-mechanism herein shown, and forming the gist of my invention, comprises a two-part collar, the respective members 35 and 36 being provided at their ends with lugs 37, receiving clamping-screws 38, by means of which the collar is clamped upon the shaft 7, so as to rotate therewith. One of the said lugs 37 is normally overhung by, but not engaged with, an upstanding guard-hook 39, the lower end of which is pivotally mounted in a bracket 40 fixed to the frame 6. For the operation of the said hook, it is connected by a link 41 to a lever-arm 42 on the inner end of a rock-shaft 43 journaled in a bracket 44 and having its opposite end provided with a lever-arm 45 connected by a link 46 with the lower end of an operating-arm 47 riveted, or otherwise fixed, to the lower face of the latch 25 aforesaid, as seen in Figs. 3 and 4. The several parts of the train of parts just now described are proportioned so that the guard-hook 39 will be retired with respect to the guard-collar on the shaft at the same time that the bolt 15 is released to couple the shaft with the fly-wheel, and conversely, to be automatically moved into its overhanging, guarding position when the bolt is withdrawn, to uncouple the fly-wheel and shaft so that the said hook will be in position to check the rotation of the shaft after it has completed one revolution, in case, for any cause whatever, it tends to continue to rotate and threaten a "repeat" of the ram or gate.

Figs. 1, 2 and 3 show the press in readiness for operation, the guard-hook 39 being in its guard position and the bolt 15 being withdrawn from the recess 14 in the fly-wheel 12 now rotating on the rear end of the shaft 7. To operate the press, the pressman depresses the treadle 33, lifting the rod 31 and hence moving the latch 25 into its depressed position, as shown in Fig. 4, whereby it is disengaged from the free end of the operating-lever 19, which is thus released to the action of the plunger 18, which asserts itself to swing the lever 19 rearward and hence bring the bolt 15 into position to be shot into the coupling-recess 14 in the continuously-rotating fly-wheel, which is thereby coupled to the shaft 7, which reciprocates the ram or gate of the press. Simultaneously with the depression of the latch 25 as described, the guard-hook 39 is automatically moved into its retired position through the train of parts connecting the said latch and hook, so that, when the bolt 15 snaps into the recess 14, the shaft is left free to turn. As soon as the pressman has thus started the press, he instinctively removes the pressure of his foot from the treadle, permitting the spring 27 to assert itself in lifting the latch into its normal position, at which time, also, the guard-hook is automatically returned to its guard position with respect to the guard-collar, this taking place during the initial rotation of the shaft, so that by the time the shaft has completed its said initial rotation, the guard-hook will be positioned to engage the guard-collar and prevent a second rotation of the shaft, or a "repeat," in case, due to any untoward circumstances, the shaft tends to continue to rotate after completing a single rotation. It will be understood that the latch, having been released to the action of the spring 27 and lifted to its normal position thereby, has its cam-surface 29 engaged by the projecting end of the operating-lever 19, whereby the same will be swung against the tension of the spring-actuated plunger 18, so as to retract the bolt 15 from the coupling-recess 14. It will thus be seen that my improved guard mechanism does not, normally, interfere with the action of the coupling and uncoupling mechanism of the press and is only brought into play when, due to some untoward circumstance, the shaft starts to "repeat". Serious accidents are thus avoided.

In addition to preventing "repeats," the guard-lever 39 acts as a warning device, since, when it is brought into play by preventing the turning of the shaft, the pressman is advised that the press needs attention because the engagement of a lug 37 of the stop-collar with the guard-hook 39 will be felt in the treadle by an extra resistance to the operation thereof.

I claim:

1. In a power machine, the combination with an intermittently-driven shaft, of a fly-wheel therefor, coupling and uncoupling mechanism for said shaft and wheel, and an automatic guard-mechanism connected with the said coupling and uncoupling mechanism for operation thereby, so that the guard-mechanism will be brought into play for preventing a second or successive revolution of the shaft after the same has been uncoupled from the fly-wheel whereby the shaft is limited to one revolution for each volitional operation of the said coupling-and-uncoupling mechanism.

2. In a power machine, the combination with an intermittently-driven shaft, of a fly-wheel therefor, treadle-operated coupling and uncoupling mechanism for the said shaft and wheel, and a guard-mechanism for preventing a second revolution of the shaft after the same has been uncoupled from the fly-wheel, the said guard-mechanism comprising a guard-collar mounted upon the shaft, a guard-hook normally free and in the path of the said collar, and a train of parts connecting the guard-hook with the said coupling and uncoupling mechanism, whereby the intermittently-driven shaft is limited to one revolution for each volitional operation of the said treadle-operated coupling-and-uncoupling mechanism.

3. In a power machine, the combination with the intermittently-operated ram thereof, of coupling and uncoupling mechanism for controlling the movement of the ram, and an automatic guard-mechanism connected with the said coupling and uncoupling mechanism for operation thereby, and constructed so that it will be brought into play for preventing an unintended second or successive movement of the ram after the coupling and uncoupling mechanism has effected the initial movement thereof, whereby the said ram is limited to one descent for each volitional operation of the said coupling-and-uncoupling mechanism.

4. In a power machine, the combination with an intermittently-moved member, coupling and uncoupling mechanism for the said member, and an automatic guard mechanism connected with the said coupling and uncoupling mechanism for operation thereby, so that the guard-mechanism will be brought into play for positively preventing a second or successive movement of the said intermittently-operated member and automatically rendered inoperative when the said coupling and uncoupling mechanism functions to couple the said intermittently-operated member to cause the effective movement thereof, whereby the intermittently-moved member is limited to one descent for each volitional operation of the said coupling-and-uncoupling mechanism.

5. In a power machine, the combination with an intermittently-driven shaft thereof, of coupling-and-uncoupling mechanism for the said shaft, a guard-member turning with the shaft, and a second guard-member connected with the said coupling-and-uncoupling mechanism and normally free of the guard-member first mentioned and automatically operated in being moved into its retired position directly by the said mechanism, whereby the said shaft is limited to one revolution for each volitional operation of the said coupling-and-uncoupling mechanism.

In testimony whereof, I have signed this specification.

HUGO C. PAECHT.